May 12, 1970 W. FISCH ET AL 3,511,922
ELECTRICAL INSULATOR OF HYDROPHTHALIC ANHYDRIDE CURED CYCLOALIPHATIC EPOXY RESINS FOR OVERHEAD LINES
Filed Oct. 27, 1967
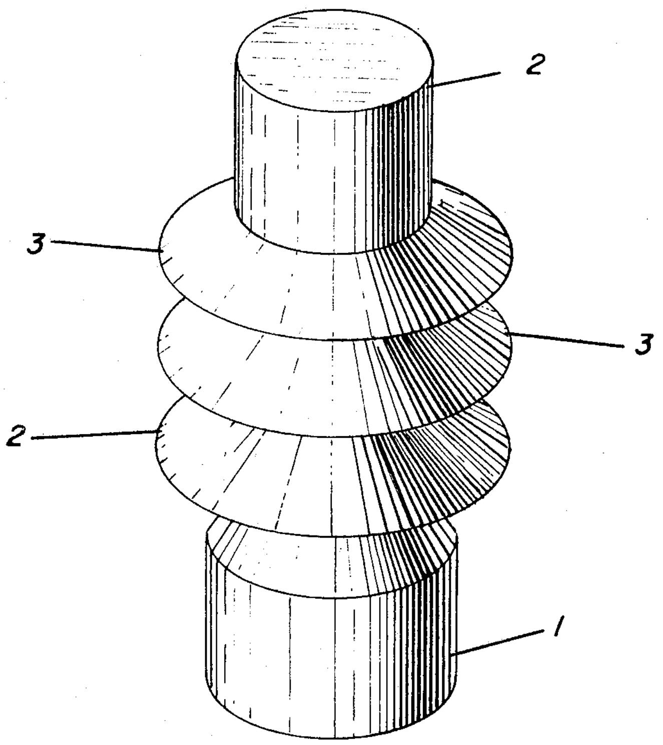
*Willy Fisch,*
*Otto Ernst and*
*Ernst Nideroest*
INVENTORS
BY Wenderoth Lind and Ponack
ATTORNEYS United States Patent Office 3,511,922
Patented May 12, 1970

3,511,922

ELECTRICAL INSULATOR OF HYDROPHTHALIC ANHYDRIDE CURED CYCLOALIPHATIC EPOXY RESINS FOR OVERHEAD LINES

Willy Fisch, Binningen, Otto Ernst, Pfeffingen, and Ernst Nideroest, Basel, Switzerland, assignors to Ciba Limited, Basel, Switzerland, a company of Switzerland Continuation-in-part of application Ser. No. 268,351, Mar. 27, 1963. This application Oct. 27, 1967, Ser. No. 691,079
Claims priority, application Switzerland, Mar. 28, 1962, 3,723/62
Int. Cl. H01b 17/00
U.S. Cl. 174—137 5 Claims

ABSTRACT OF THE DISCLOSURE

An electrical insulator for overhead lines constituted as an elongate insulating body essentially consisting of an insulating material and being provided at one extremity with a support member for at least one line conductor and being also provided at the remaining extremity with means for securing the said insulator to a structural support member, the outer surface of the said insulating body being formed with skirts for increasing the external creepage distance on the insulator surface, and at least those parts of the said elongate insulating body which are exposed to ambient atmospheric contaminating conditions consisting of a thermoset resin composition obtained by heat-curing a curable composition essentially consisting of (1) a cycloaliphatic 1:2-epoxy compound having a 1:2-epoxy equivalency greater than 1; (2) a curing agent selected from the class consisting of cycloaliphatic polycarboxylic acid anhydrides and aliphatic polycarboxylic acid anhydrides, said curing agent (2) being present in a proportion of 0.2 to 4 parts by weight per 1 part by weight of the cycloaliphatic 1:2-epoxy compound (1); and (3) zero to 90% by weight calculated on the total amount of the composition of particulate insulating filler, said thermoset resin composition showing no tendency to form carbonaceous deposits upon exposure to conditions which promote creepage electrical discharges.

This application is a continuation-in-part application of our copending application Ser. No. 268,351, filed Mar. 27, 1963.

The present invention provides electrical insulators for overhead lines, more especially pin-type, suspension and bushing insulators, having good electrical properties and distinguished by high resistance towards contaminating atmospheric influences.

More particularly the present invention provides electrical insulators for overhead lines constituted as elongate insulating body comprising organic insulating material, said organic insulating material showing no appreciable tendency to form carbonaceous deposits upon exposure to conditions which promote creepage electrical discharges, as occur in outdoor installations, where there may be accumulations of dust, rain and other evnironmental contaminants.

In the past overhead line insulators were manufactured almost exclusively from porcelain and glass since they are absolutely stable towards moisture and other atmospheric contaminants. However porcelain and glass have various shortcomings. Insulators from, for example, porcelain are very difficult to manufacture to close dimensional tolerances. The brittleness of porcelain and glass, which finds its expression in a low impact strength, has a disadvantageous influence on transport and installation. Owing to their brittleness porcelain and glass are sensitive to temperature changes. Extreme temperature fluctuations of the atmosphere may destroy porcelain or glass insulators. It has already been tried to replace porcelain by organic insulating material in the manufacture of overhead line insulators. However although certain types of such organic insulating materials would otherwise be very attractive for their good electrical properties and are well established for electrical indoor applications, they have proved to be entirely unsatisfactory for electrical equipment subjected to contaminating atmospheric conditions, such as moisture, fog, dust and salt, and the action of ultraviolet radiation which all tend to reduce the tracking resistance and the arc resistance and which increase the corona effect.

Organic insulating material which experience this limitation include the thermoset resin compositions which are obtained by curing conventional epoxy resins based on glycidylethers of Bisphenol A (2,2-bis(p-hydroxyphenyl)propane). In spite of the well known good electrical properties of cured products derived from conventional Bisphenol glycidyl ethers and curing agents, these type of material rapidly failed in outdoor insulators exposed to ambient atmospheric contaminating conditions due to creepage electrical discharges and subsequent formation of carbonaceous deposits in the insulation.

The evaluation of insulating materials which are suitable for outdoor use is rendered difficult by fact that there exist no standard test methods from which the performance of insulating material under outdoor conditions can be forecast in the absence of actual time-wasting field tests. Discharges of the creepage type must be distinguished from those caused by establishment of an arc through or directly between two parts of electric apparatus having different potentials. Under arcing conditions, while the organic material adjacent to the arc is carbonized, the arc track so formed is not random in character, but forms a direct path along the line of the arc. In contrast, tracks due to creepage are random in effect and produce a tree-like path. It is thus pointed out in ASTM Test D495–48T that the test directed to determining the resistance of insulating material to arcs does not in general permit conclusions to be drawn as to the resistance of the material to other types of arc such as those promoted by conducting contaminants.

It is evident from the above that materials which are effective in protecting against the effect of direct arcing are not necessarily effective in protecting against creepage breakdown.

It has now surprisingly been found that—in sharp contrast to the known cured compositions from conventional Bisphenol-A glycidyl ethers and curing agents—the thermoset products obtained by heat-curing a composition comprising a cycloaliphatic polyepoxide and a cycloaliphatic or aliphatic-poly-carboxylic acid anhydride share the beneficial properties of porcelain and glass as insulating materials for electrical outdoor insulators while being devoid of their disadvantages. In particular such thermoset products will exhibit the outstanding mechanical properties of conventional organic insulators and at the same time will not form carbonaceous deposits upon exposure to conditions promoting creepage electrical discharges.

While it is possible to include into these organic outdoor insulating materials based on cycloaliphatic epoxy resins also known particulate insulating fillers, e.g. inorganic particulate fillers such as quartz meal calcium sulfate, calcium carbonate, kaoline, titanium hydroxide or hydrated alumina in a proportion up to 90% by weight of the total amount of the insulating composition, the addition of such a filler is entirely optional and is by no means necessary in order to obtain the beneficial results of the invention. It is thus possible to make outdoor insulators with excellent mechanical properties and outstanding performance under long-lasting heavy exposure to contaminating atmospheric conditions, such as moisture, fog, dust and salt without any addition of the above mentioned optional particulate fillers at all.

Accordingly the instant invention provides an electrical insulator for overhead lines constituted as an elongate insulating body essentially consisting of an insulating material and being provided at one extremity with a support member for at least one line conductor and being also provided at the remaining extremity with means for securing the said insulator to a structural support member, the outer surface of the said insulating body being formed with skirts for increasing the external creepage distance on the insulator surface, and at least those parts of the said elongate insulating body which are exposed to ambient atmospheric contaminating conditions consisting of a thermoset resin composition obtained by heat-curing a curable composition essentially consisting of (1) a cycloaliphatic 1:2-epoxy compound having a 1:2-epoxy equivalency greater than 1; (2) a curing agent selected from the class consisting of cycloaliphatic polycarboxylic acid anhydrides and aliphatic polycarboxylic acid anhydrides said curing agent (2) being present in a proportion of 0.2 to 4 parts by weight per 1 part by weight of the cycloaliphatic 1:2-epoxy compound (1); and (3) zero to 90% by weight calculated on the total amount of the composition of a particulate insulating filler, said thermoset resin composition showing no appreciable tendency to form carbonaceous deposits upon exposure to conditions which promote creepage electrical discharges.

The cycloaliphatic 1:2-epoxy compounds having an epoxide equivalency greater than 1, used as starting materials, are compounds which contain calculated for the average molecular weight *n* groups of the formula

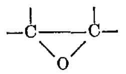

where *n* is a whole or fractional number greater than 1. The 1:2-epoxide groups may be terminal or inner ones. Particularly suitable terminal 1:2-epoxide groups are 1:2-epoxyethyl or 1:2-epoxypropyl groups. Preferably, they are 1:2-epoxy-propyl groups linked to an oxygen atom, that is to say they are glycidylether or glycidylester groups.

As examples of cycloaliphatic polyepoxides containing only terminal 1:2-epoxide groups there may be mentioned the compounds of the following formulae

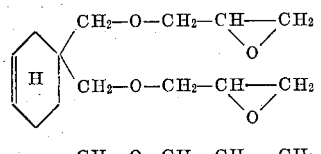

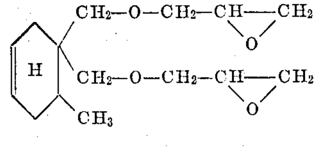

as well as the halogenated epoxy compounds of the formulae

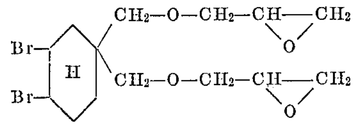

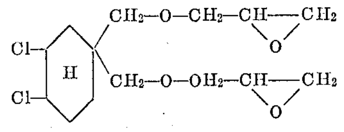

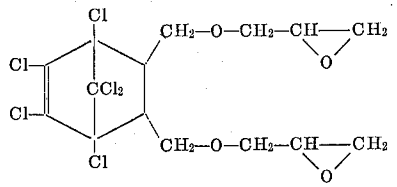

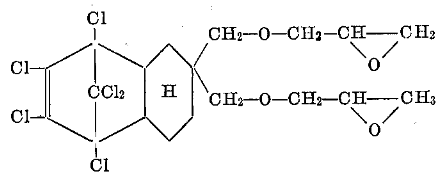

When such halogenated, more especially chlorinated or brominated, polyepoxides are used exclusively or concomitantly, the resulting cured resins have in addition flame-inhibiting properties.

There are further especially suitable glycidyl esters of cycloaliphatic polycarboxylic acids, such as in particular $\Delta^4$-tetrahydrophthalic acid diglycidyl ester of the formula

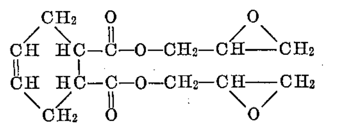

hexahydrophthalic acid diglycidyl ester of the formula

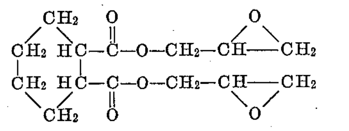

4-methyl-$\Delta^4$-tetrahydrophthalic acid diglycidyl ester of the formula

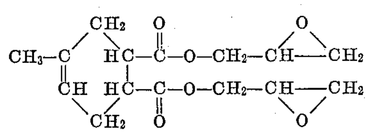

and 4-methyl-hexahydrophthalic acid diglycidyl ester of the formula

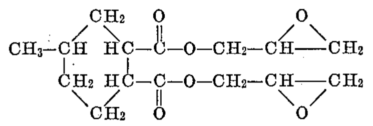

Compounds with inner epoxide groups contain at least one 1:2-epoxide group in an aliphatic chain

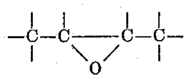

or at a cycloaliphatic ring.

Particularly good results are obtained by using cycloaliphatic polyepoxy compounds that contain at least one inner 1:2-epoxide group attached to a cycloaliphatic five-membered or six-membered carbocyclic ring. There may be mentioned, for example, epoxidized cyclic dienes such as 1:2:4:5-diepoxycyclohexane, dicyclopentadiene diepoxide, limonent diepoxide and especially vinylcyclohexene diepoxide; also cycloaliphatic epoxyethers, epoxyester and epoxyacetals containing at least one cycloaliphatic 5-membered or 6-membered ring, to which at least one 1:2-epoxide group is attached, for example the compounds of the following formulae:

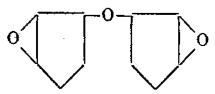

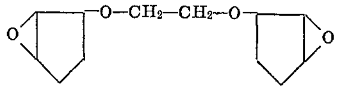

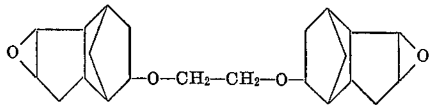

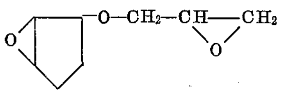

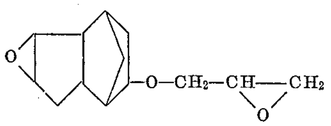

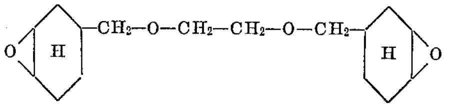

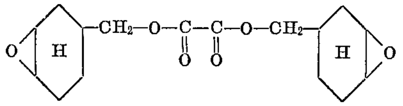

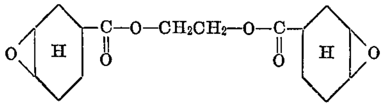

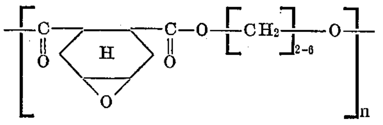

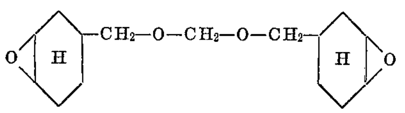

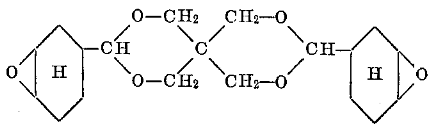

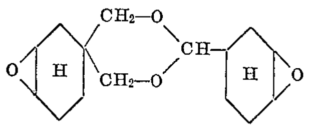

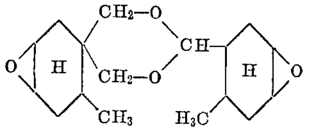

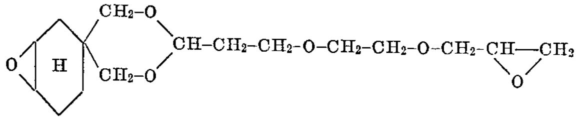

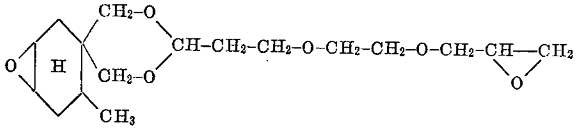

Especially preferred are the diepoxides of the formulae:

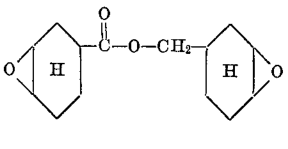

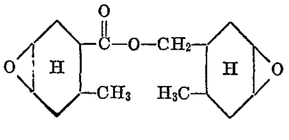

Finally, there are suitable telomers containing epoxide groups, such as are obtained by telomerization of ethylenically unsaturated monoepoxides of the cycloaliphatic series, such as 3:4-epoxy-tetrahydrodicyclopentadienyl-8-allyl ether or 3-vinyl - 2:4 - dioxo spiro (5.5)-9:10-epoxyundecane with telogens such as carbon tetrachloride, dimethylphosphite or cyclohexanone, in the presence of an organic peroxide.

To the cycloaliphatic polyepoxy compound there may be added as active diluent a cycloaliphatic monoepoxide such as vinylcyclohexene monoxide, 3:4-epoxy-tetrahydro-dicyclopentadienol-8, 3:4 - epoxy - hexahydrobenzal glycerol or 3:4 - epoxycyclohexane - 1:1 - dimethanol acrolein acetal.

Preferably used curing agents are cycloaliphatic polycarboxylic acid anhydrides which, if desired, may be halogenated, such as tetrahydrophthalic anhydride, 4-methyl-tetrahydrophthalic anhydride, hexahydrophthalic anhydride, 4-methyl - hexahydrophthalic anhydride, 3:6-endomethylene - tetrahydrophthalic anhydride, methyl-3:6-endomethylene - tetradrophthalic anhydride (=methyl nadic anhydride) or 3:4:5:6:7:7-hexachloro-3:6-endomethylene-tetrahydrophthalic anhydride.

Further suitable are aliphatic polycarboxylic acid anhydrides, for example, succinic, glutaric, polyadipic, azelaic, maleic, itaconic or aconitic acid anhydride; allyl-succinic, pentenyl-succinic, hexenyl-succinic, dodecenyl-succinic anhydride; vinyloxy-succinic, 7-allyl - bicyclo(2.2.1) - hept - 5 - ene-2:3-dicarboxylic, 7-octenyl-bicyclo(2.2.1) - hept - 5 - ene-2:3-dicarboxylic and methyl-7-allyl - bicyclo(2.2.1) - hept-5-ene-2:3-dicarboxylic acid anhydride.

If desired, there may be further used a curing accelerator, such as a tertiary amine, or a salt or quaternary ammonium salt thereof, e.g. benzyldimethylamine, 2,4,6-tris (dimethylaminomethyl)phenol or triamyl ammoniumphenolate, or an alkali metal alcoholate, e.g. the sodium alcoholate of 2,4-dihydroxy-3-hydroxymethyl-pentane.

The curable mixtures of cycloaliphatic polyepoxide and cycloaliphatic or aliphatic polycarboxylic acid anhydride may be further mixed at any state prior to the curing operation with fillers, plasticizers, pigments, dyestuffs, flame-inhibitors, mould releasing agents and the like. Suitable extenders and fillers are, for example, rutil, mica, quartz meal, rock meal, kaolin, titanium hydroxide, alumina trihydrate, calcium carbonate, ground dolomite, gypsum or barium sulfate.

To improve the mechanical strength properties one may further add fibers or fabrics of glass, boron, polyesters, nylon, polyacrylonitrile, silk, cellulose or cotton.

One typical embodiment of an overhead line insulator according to the invention is illustrated in the accompanying drawing. The figure represents a pin-type insulator such as is used, for example, in the construction of overhead lines, and which consists of a thermoset resin composition obtained by heat-curing a mixture of a cycloaliphatic polyepoxide and a cycloaliphatic or aliphatic polycarboxylic anhydride. The insulator body comprises the foot 1, the supporting head 2 and the intermediate annular ribs or skirts 3, the purpose of which is to lengthen the creepage distance on the insulator surface.

The above described overhead line insulators made from the herein proposed organic insulating material combine good mechanical and electrical properties with outstanding resistance both to the effects of sun light, of temperature variations within a wide range, and especially to the effects of contaminating atmospheric influences. They display an astonishingly high resistance to arc tracking, glow discharges and surface creepage electrical discharges respectively.

All these are properties of decisive importance to overhead line insulators.

The nature of the thermoset compositions constituting the organic insulating material of which the body of the above described insulator is made can be better understood by consideration of the particular compositions described in the following Examples 1 to 7:

EXAMPLE 1

A curable casting resin mixture was prepared by dissolving in 45 parts by weight of hexahydrophthalic anhydride at about 40° C. 100 parts by weight of 3:4-epoxyhexahydrobenzal-3':4'-epoxy-1':1' - bis(hydroxymethyl)-cyclohexane (described in Example 1 of French specification No. 1,233,231, granted July 22, 1959, to Batzer et al.). A part of the casting resin mixture thus prepared was cast in cylindrical moulds to form an insulator as shown in the accompanying drawing, and then cured for 24 hours at 140° C. This insulator was exposed in an industrial area to severe contaminating atmospheric agencies including moisture, fog and dust for a prolonged period of several months, after which no change in the surface was observed, that is to say that the tracking resistance, arc resistance and the corona effect were not adversely affected. From the same casting resin mixture plates (12 x 12 x 0.4 cm.) were cast and cured as described above. Such a plate was tested for its arc resistance according to DIN 53484 (VDE 0303 Part 5), the high stage L4 being reached. Another plate was subjected to the Xeno test for 2000 hours to test its fastness to light; no change in the surface was detected.

EXAMPLE 2

The method described in Example 1 was used except that instead of hexahydrophthalic anhydride the curing agent used was 43 parts by weight of tetrahydrophthalic anhydride (Specimen A) or 47 parts by weight of endomethylene tetrahydrophthalic anhydride (Specimen B) dissolved at about 80 and 100° C. respectively in the diepoxy compound. In Test C a casting resin mixture was used which had been obtained by dissolving at about 40° C. 70 parts by weight of hexahydrophthalic anhydride in 100 parts by weight of a polyglycidyl ether resin which is liquid at room temperature and contains 5.3 epoxide equivalents per kg. (prepared by reacting epichlorohydrin with bis-[parahydroxyphenyl]-dimethylmethane in the presence of alkali).

One part each of the resulting casting resin mixtures was cast in cylindrical moulds to form insulators as described in Example 1 and cured for 24 hours at 140° C. The insulators made from the Specimens A and B displayed a resistance to severe contaminating atmospheric agencies equal to that of the insulator made as described in Example 1. On the other hand, the insulator made from Specimen C displayed after the weathering test impaired electrical properties and after the Xeno test over 2000 hours showed a strong discoloration of the surface.

One part of each of the identical casting resin mixtures was used to make plates (12 x 12 x 0.6 cm.) and castings (4 x 14 x 1 cm.) which were then cured as described above.

The values of the tracking resistance, impact strength, flexural strength and heat distortion point according to Martens (DIN) of the cured plates and castings are shown in the following table:

| Specimen | Arc resistance, stage | Impact strength, cmkg./cm.$^2$ | Flexural strength, kg./mm.$^2$ | Heat distortion point according to Martens (DIN), ° C. |
|---|---|---|---|---|
| A | L4 | 4.0 | 1.5 | 175 |
| B | L4 | 4.0 | 1.7 | 127 |
| C | L1 | 4.5 | 1.7 | 93 |

EXAMPLE 3

Insulators and plates were made as described in Example 1 but instead of 100 parts by weight of 3:4-epoxyhexahydrobenzal-3':4'-epoxy - 1':1' - bis(hydroxymethyl) cyclohexane and 45 parts by weight of hexahydrophthalic anhydride there were used: In Test D 100 parts by weight of glycerol-bis-8 (or 9) - [3:4 - epoxytetrahydro-exo-dicyclo-pentadienyl]-ether (described in French specification No. 1,317,513, granted Mar. 5, 1962 to Nikles et al.), Example 1; containing 4.9 epoxide equivalents per kg.) and 56 parts by weight of hexahydrophthalic anhydride as curing agents; in Test E 100 parts by weight of ethyleneglycol-bis-(3:4-epoxytetrahydro - exo - dicyclopentadienyl)-ether, containing 5.05 epoxide equivalents per kg., marketed by Messrs. Roehm and Haas under the registered trade mark "AG-13E," and 58 parts by weight of hexahydrophthalic anhydride as curing agent; in Test F 100 parts by weight of the diepoxy compound of the formula

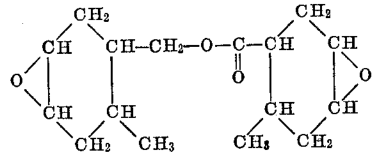

containing 6.4 epoxide equivalents per kg., marketed by Messrs. Union Carbide under the registered trade mark "UNOX-201," and 42 parts by weight of hexahydrophthalic anhydride as curing agent; and in Test G 100 parts by weight of the polyepoxy compound of the formula

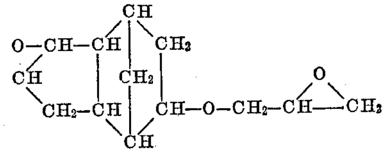

containing 6.4 epoxide equivalents per kg., described in Example 1 of French specification No. 1,261,102, granted June 28, 1960 to D. Porret and 81.5 parts by weight of hexahydrophthalic anhydride as curing agent. Each casting was cured for 24 hours at 140° C. and then for 24 hours at 200° C. All the insulators obtained in this manner displayed a resistance to severe contaminating atmospheric agencies equal to that of the insulator manufactured as described in Example 1. The arc resistance and tracking resistance values measured with the cured plates D, E, F and G reached in all instances the highest stage L4 and T5 respectively.

EXAMPLE 4

For the manufacture of insulators and test plates as described in Example 1 the following casting resins mixtures are used:

In Test H 100 parts by weight of the diepoxy compound containing 6.2 epoxide equivalents per kg. of Example 1 and 75 parts by weight of hexahydrophthalic anhydride were used as curing agent; in Test J 100 parts by weight of the polyglycidyl ether resin described in Example 2 (Test C), containing 5.3 epoxide equivalents per kg., and 77 parts by weight of hexahydrophthalic anhydride were used as curing agent. To each specimen there were added 6 parts by weight of a sodium alcoholate obtained by dissolving 0.82 part by weight of sodium metal in 100 parts by weight of 2:4-dihydroxy-3-hydroxymethylpentane at about 130° C. as accelerator, as well as 300 parts by weight of the silicon dioxide marketed under the trade name "Quartz meal K8" and 50 parts by by weight of alumina trihydrate as filler.

Specimen H was cured for 6 hours at 110° C. and Specimen J for 16 hours at 140° C. The insulator made from Specimen H had approximately the same resistance to severe contaminating atmospheric agencies as the insulator of Example 1, whereas the insulator made from Specimen J displays after the weathering test a discoloration of its surface and its electrical properties had deteriorated.

In the following table are shown the arc resistance, heat distortion point according to Martens (DIN) and flexural strength values measured on the cured plates H and J:

| Test | Cured for— (hours) | At ° C. | Arc resistance, stage | Heat point distortion according to Martens (DIN), ° C. | Flexural strength, kg.mm.² |
|---|---|---|---|---|---|
| H | 6 | 110 | L4 | 138 | 7.1 |
| J | 16 | 140 | L1 | 110 | 7.3 |

EXAMPLE 5

100 parts by weight of the diepoxy compound of Example 1, containing 6.2 epoxide equivalents per kg., were mixed: In Test K with methylendomethylene-tetrahydrophthalic anhydride, in Test L with glutaric anhydride and in Test M with phthalic anhydride as curing agent. In all three tests there were used per equivalent of epoxide group 0.9 equivalent of anhydride groups and as accelerator 12 parts of the sodium alcoholate described in Example 4.

The resulting casting mixtures were used for casting insulators and plates as described in Example 1. Specimen K was cured for 24 hours at 160° C., Specimen L for 24 hours at 140° C. and Specimen M 24 hours at 120° C.

The insulators made from Specimens K and L displayed approximately the same resistance to severe contaminating atmospheric agencies as the insulator made in Example 1, while the insulator obtained from specimen M displayed deteriorated electrical properties after the weathering test.

While the insulators made from Specimens K and L reached the highest stage L4 in the arc resistance test, Specimen M displayed the lowest stage L1.

EXAMPLE 6

Insulators and test plates were made as described in Example 1 from the following casting resin mixtures:

Specimen N was prepared by dissolving 88.5 parts by weight of hexahydrophthalic anhydride at 40° C. in 100 parts by weight of the diglycidyl ether of the general formula

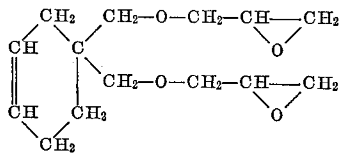

described in Example 1 of French specification No. 1,251,608, granted Mar. 16, 1960 to Nikles et al., containing 6.2 epoxide equivalents per kg. Specimen O was obtained by dissolving 30 parts by weight of hexahydrophthalic anhydride at 100° C. in 100 parts by weight of a polyglycidyl ether resin which is solid at room temperature and contains 2.4 epoxide equivalents per kg. (prepared by reacting epichlorohydrin with bis-[parahydroxyphenyl]-dimethylmethane in the presence of alkali). The two casting resin mixtures were cast in cylindrical moulds to form insulators and in aluminum moulds (12 x 12 x 0.4 cm.) to form test plates, all of which were cured for 24 hours at 140° C., as in Example 1.

The insulator made from Specimen N displayed excellent resistance to severe contaminating atmospheric agencies; the insulator made from Specimen O displayed after the weathering test a discolored surface and its electrical properties had deteriorated.

The arc resistance of the plate from the cured specimen N displayed the highest stage L4 and the plate from the cured Specimen O the lowest stage L1.

EXAMPLE 7

The surprising superiority of an outdoor insulator according to the invention as compared with an insulator consisting of a cured epoxy resin based on Bisphenol A is further shown by the following field test carried out in an industrial area with heavy atmospheric pollution:

Specimens labelled 1 to 4 for testing as outdoor electrical insulators were made. Specimens Nos. 3 and 4 were prepared from a conventional epoxy resin based on Bisphenol A and phthalic anhydride as a hardener, while specimens Nos. 1 and 2 were prepared in accordance with present invention.

The compositions described below were cast in cylindrical moulds each of one inch diameter and having a length slightly in excess of six inches. Except where indicated, the compositions were cured by heating them for 2 hours at 80° C. followed by heating for 16 hours at 120° C. The castings were each cut to a length of six inches.

In the following, "Epoxy resin A" denotes the cycloaliphatic 1:2-epoxy compound having a 1:2-epoxide equivalence greater than 1, containing approximately 6.2 epoxide equivalents per kilogram and being of the formula

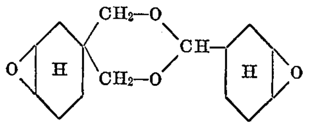

This is the cycloaliphatic 1:2-epoxy compound used in Example 1 above.

"Epoxy resin B" denotes the cycloaliphatic 1:2-epoxy compound having a 1:2-epoxide equivalence greater than 1, containing 6.4 epoxide equivalents per kilogram and being of the formula

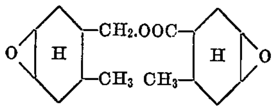

This is the cycloaliphatic 1:2-epoxy compound used in Example 3 above.

"Epoxy resin C" denotes the aromatic 1:2-epoxy compound having a 1:2-epoxide equivalency greater than 1, obtained in a conventional manner by the reaction of bisphenol A with epichlorohydrin in the presence of alkali; it contains 2.2 to 2.5 epoxide equivalents per kilogram.

"Accelerator" denotes the product obtained by dissolving sodium metal (0.82 part by weight) in 3-hydroxymethylpentane-2,4-diol (100 parts by weight).

Specimen No. 1

Thermoset resin composition according to invention:

| | Parts by weight |
|---|---|
| Epoxy resin A | 100 |
| Hexahydrophthalic anhydride | 95 |
| Accelerator | 12 |

Cured for 4 hours at 80° C. followed by 16 hours at 120° C.

Specimen No. 2

Thermoset resin composition according to invention:

| | Parts by weight |
|---|---|
| Epoxy resin B | 100 |
| Hexahydrophthalic anhydride | 90 |
| Accelerator | 12 |

Specimen No. 3

Thermoset resin composition based on bisphenol A epoxy resin plus aromatic polycarboxylic acid anhydride:

| | Parts by weight |
|---|---|
| Epoxy resin C | 100 |
| Phthalic anhydride | 30 |
| Accelerator | 12 |

Specimen No. 4

Thermoset resin composition based on bisphenol A epoxy resin plus aromatic polycarboxylic acid anhydride:

| | Parts by weight |
|---|---|
| Epoxy resin C | 100 |
| Phthalic anhydride | 30 |
| Accelerator | nil |

Cured for 16 hours at 120° C.

WEATHERING TEST UNDER LOAD

To compare the resistance of the castings to currents of high voltage, the castings were fitted with brass terminals and mounted on a test rig, and then connected to an electrical supply (having a frequency of 50 cycles per second) such as to provide a voltage to the samples of 3.15 kv. per inch.

The test site is situated on the south-west edge of Manchester, England. In the immediate vicinity are a power station, a gas works and a foundry. According to the Industrial Pollution Committee of the Manchester Council, this area has one of the most heavily polluted atmospheres in Great Britain. The average monthly rainfall is 3.2 inches, and the average weight of solids deposited from the atmosphere is estimated by this Committee to amount to 16 tons per square mile per month.

RESULT

At the first inspection of the specimens, 66½ hours after connection to the electrical supply, it was seen that Specimens Nos. 3 and 4 has already burnt out. Severe tracking was clearly evident on both Specimens Nos. 3 and 4, while the other specimens, viz Nos. 1 and 2, were in good condition, still fully operative and successfully withstanding the effects of the high voltage current applied thereto under severe conditions of atmospheric pollution.

We claim:

1. An electrical insulator for overhead lines constituted as an elongate insulating body essentially consisting of an insulating material and being provided at one extremity with a support member for at least one line conductor and being also provided at the remaining extremity with means for securing the said insulator to a structural support member, the outer surface of the said insulating body being formed with skirts for increasing the external creepage distance on the insulator surface, and at least those parts of the said elongate insulating body which are exposed to ambient atmospheric contaminating conditions, such as moisture, fog, rain, dust, or salt, which promote creepage electrical discharges, consisting of a thermoset resin composition obtained by heat-curing a curable composition essentially consisting of (1) a cycloaliphatic 1:2-epoxy compound having a 1:2-epoxy equivalency greater than 1 and containing at least one 5-membered or 6-membered cycloaliphatic carbocyclic ring; (2) a curing agent selected from the class consisting of cycloaliphatic polycarboxylic acid anhydrides and aliphatic polycarboxylic acid anhydrides, said curing agent (2) being present in a proportion of 0.2 to 4 parts by weight per 1 part by weight of the cycloaliphatic 1:2-epoxy compound (1); and (3) zero to 90% by weight calculated on the total amount of the composition of particulate insulating filler, said thermoset resin composition showing no tendency to form carbonaceous deposits upon exposure to conditions which promote creepage electrical discharges.

2. An electrical insulator for overhead lines constituted as an elongate insulating body essentially consisting of an insulating material and being provided at one extremity with a support member for at least one line conductor and being also provided at the remaining extremity with means for securing the said insulator to a structural support member, the outer surface of the said insulating body being formed with skirts for increasing the external creepage distance on the insulator surface, and at least those parts of the said elongate insulating body which are exposed to ambient atmospheric contaminating conditions, such as moisture, fog, rain, dust, or salt, which promote creepage electrical discharges, consisting of a thermoset resin composition obtained by heat-curing a curable composition essentially consisting of (1) a cycloaliphatic 1:2-epoxy compound having a 1:2-epoxy equivalency greater than 1, and containing at least one 5-membered or 6-membered cycloaliphatic carbocyclic ring, the 1:2 epoxy groups in said cycloaliphatic compound being attached to the carbocyclic ring or in an aliphatic group linked to the carbocyclic ring; (2) a curing agent selected from the class consisting of cycloaliphatic polycarboxylic acid anhydrides and aliphatic polycarboxylic acid anhydrides, said curing agent (2) being present in a proportion of 0.2 to 4 parts by weight per 1 part by weight of the cycloaliphatic 1:2-epoxy compound (1); and (3) zero to 90% by weight calculated on the total amount of the composition of particulate insulating filler, said thermoset resin composition showing no appreciable tendency to form carbonaceous deposits upon exposure to conditions which promote creepage electrical discharges.

3. An electrical insulator for overhead lines constituted as an elongate insulating body essentially consisting of an insulating material and being provided at one extremity with a support member for at least one line conductor and being also provided at the remaining extremity with means for securing the said insulator to a structural support member, the outer surface of the said insulating body being formed with skirts for increasing the external creepage distance on the insulator surface, and at least those parts of the said elongate insulating body which are exposed to ambient atmospheric contaminating conditions, such as moisture, fog, rain, dust or salt, which promote creepage electrical discharges, consisting of a thermoset resin composition obtained by heat-curing a curable composition essentially consisting of (1) a cycloaliphatic 1:2-epoxy compound having a 1:2-epoxy equivalency greater than 1 and containing at least one 5-membered or 6-membered cycloaliphatic carbocyclic ring; (2) a curing agent selected from the class consisting of cycloaliphatic polycarboxylic acid anhydrides and aliphatic polycarboxylic acid anhydrides, said curing agent (2) being present in a proportion of 0.2 to 4 parts by weight per 1 part by weight of the cycloaliphatic 1:2-epoxy compound (1); (3) zero to 90% by weight calculated on the total amount of the composition of particulate insulating filler, and (4) as active diluent a cycloaliphatic mono-1:2-epoxide, said thermoset resin composition showing no appreciable tendency to form carbonaceous deposits upon exposure to conditions which promote creepage electrical discharges.

4. An electrical insulator for overhead lines constituted as an elongate insulating body essentially consisting of an insulating material and being provided at one extremity with a support member for at least one line conductor and being also provided at the remaining extremity with means for securing the said insulator to a structural support member, the outer surface of the said insulating body being formed with skirts for increasing the external creepage distance on the insulator surface, and at least those parts of the said elongate insulating body which are exposed to ambient atmospheric contaminating conditions, such as moisture, fog, rain, dust or salt, which promote creepage electrical discharges, consisting of a thermoset resin composition obtained by heat-curing a curable composition essentially consisting of (1) a cycloaliphatic 1:2-epoxy compound having a 1:2-epoxy equivalency greater than 1, said 1:2-epoxy compound being a member selected from the group consisting of a compound of the formula

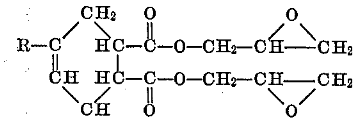

a compound of the formula

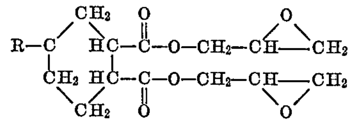

a compound of the formula

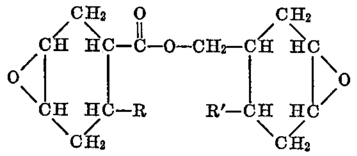

a compound of the formula

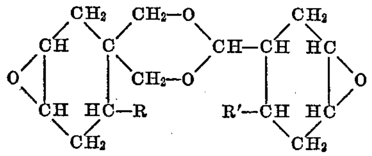

a compound of the formula

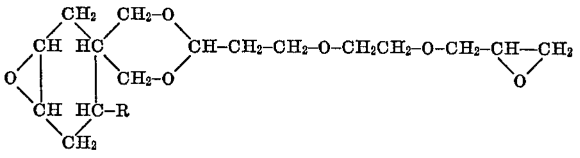

and a compound of the formula

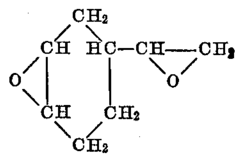

wherein R and R′ each are members selected from the group consisting of hydrogen atom and methyl group; (2) as curing agent a cycloaliphatic polycarboxylic anhydride selected from the group consisting of tetrahydrophthalic anhydride, 4-methyl-tetrahydro-phthalic anhydride, hexahydrophthalic anhydride, 4-methyl-hexahydrophthalic anhydride, 3:6 - endomethylene - tetrahydrophthalic anhydride, methyl-3:6-endomethylene - tetrahydro-phthalic anhydride and 3:4:5:6:7:7-hexachloro-3:6-endomethylene-tetrahydro-phthalic anhydride, said curing agent (2) being present in a proportion of 0.2 to 4 parts by weight per 1 part by weight of the cycloaliphatic 1:2-epoxy compound (1); and (3) zero to 90% by weight calculated on the total amount of the composition of particulate insulating filler, said thermoset resin composition showing no appreciable tendency to form carbonaceous deposits upon exposure to conditions which promote creepage electrical discharges.

5. An electrical insulator for overhead lines constituted as an elongate insulating body essentially consisting of an insulating material and being provided at one extremity with a support member for at least one line conductor and being also provided at the remaining extremity with means for securing the said insulator to a structural support member, the outer surface of the said insulating body being formed with skirts for increasing the external creepage distance on the insulator surface, and at least those parts of the said elongate insulating body which are exposed to ambient atmospheric contaminating conditions, such as moisture, fog, rain, dust or salt, which promote creepage electrical discharges, consisting of a thermoset resin composition obtained by heat-curing a curable composition essentially consisting of (1) a cycloaliphatic 1:2-epoxy compound having a 1:2-epoxy equivalency greater than 1, said 1:2-epoxy compound being a member selected from the group consisting of a compound of the formula

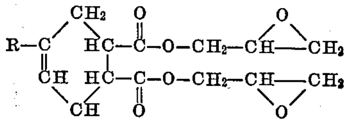

a compound of the formula

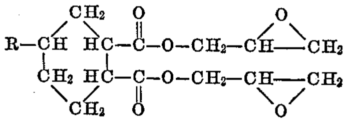

a compound of the formula

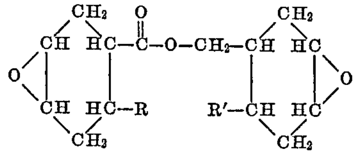

wherein R and R′ each are members selected from the group consisting of hydrogen atom and methyl group; (2) as curing agent a cycloaliphatic polycarboxylic anhydride selected from the group consisting of tetrahydrophthalic anhydride, 4-methyl-tetrahydro-phthalic anhydride, hexahydrophthalic anhydride, 4-methyl - hexahydrophthalic anhydride, 3:6 - endomethylene - tetrahydrophthalic anhydride, methyl-3:6-endomethylene - tetrahydro-phthalic anhydride and 3:4:5:6:7:7-hexachloro-3:6-endomethylene-tetrahydro-phthalic anhydride, said curing agent (2) being present in a proportion of 0.2 to 4 parts by weight per 1 part by weight of the cycloaliphatic 1:2-epoxy compound (1); and (3) zero to 90% by weight calculated on the total amount of the composition of particulate insulating filler, said thermoset resin composition showing no appreciable tendency to form carbonaceous deposits upon exposure to conditions which promote creepage electrical discharges.

References Cited

UNITED STATES PATENTS

| | | | |
|---|---|---|---|
| 2,961,518 | 11/1960 | Hermann | 200—166 |
| 3,086,888 | 4/1963 | Stratton et al. | 260—830 |
| 3,138,618 | 6/1964 | Nikles et al. | 260—78.4 |
| 3,147,279 | 9/1964 | Porret et al. | 260—78.4 |

FOREIGN PATENTS

| | | |
|---|---|---|
| 1,113,726 | 9/1961 | Germany. |
| 1,233,231 | 7/1959 | France. |

BENJAMIN R. PADGETT, Primary Examiner

U.S. Cl. X.R.

174—177, 209